United States Patent
Alshinnawi et al.

(10) Patent No.: US 9,424,253 B2
(45) Date of Patent: *Aug. 23, 2016

(54) DOMAIN SPECIFIC NATURAL LANGUAGE NORMALIZATION

(71) Applicant: International Business Machines Corporation, Armonk, NY (US)

(72) Inventors: Shareef Alshinnawi, Durham, NC (US); Gary D. Cudak, Creedmoor, NC (US); Edward S. Suffern, Chapel Hill, NC (US); John M. Weber, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/812,198

(22) Filed: Jul. 29, 2015

(65) Prior Publication Data

US 2015/0331854 A1 Nov. 19, 2015

Related U.S. Application Data

(63) Continuation of application No. 13/414,687, filed on Mar. 7, 2012, now Pat. No. 9,122,673.

(51) Int. Cl.
*G06F 17/28* (2006.01)
*G06F 17/21* (2006.01)
*G06F 17/27* (2006.01)

(52) U.S. Cl.
CPC ............... *G06F 17/28* (2013.01); *G06F 17/21* (2013.01); *G06F 17/2795* (2013.01)

(58) Field of Classification Search
CPC .. G10L 17/24; G10L 17/2735; G10L 17/2795
See application file for complete search history.

(56) References Cited

U.S. PATENT DOCUMENTS

| 6,026,388 A | 2/2000 | Liddy et al. |
| 6,282,509 B1 | 8/2001 | Miyauchi |
| 7,191,119 B2 | 3/2007 | Epstein et al. |
| 9,122,673 B2 * | 9/2015 | Alshinnawi ......... G06F 17/2795 |
| 2001/0029455 A1 | 10/2001 | Chin et al. |

(Continued)

FOREIGN PATENT DOCUMENTS

| CN | 101398814 A | 4/2009 |
| CN | 101620608 A | 1/2010 |

(Continued)

*Primary Examiner* — Angela A Armstrong
(74) *Attorney, Agent, or Firm* — Steven M. Greenberg, Esq.; CRGO Law

(57) ABSTRACT

Embodiments of the present invention provide a method, system and computer program product for the domain specific normalization of a corpus of text. In an embodiment of the invention, a method for domain specific normalization of a corpus of text is provided, including an industrial, organization, demographic or geographic domain. The method includes loading a corpus of text in memory of a computer and determining a domain for the corpus of text. The method also includes retrieving a lexicon of replacement words for the determined domain. Finally, the method includes text simplifying the corpus of text using the retrieved lexicon. In one aspect of the embodiment, the domain is determined through inference based upon words already presence in the corpus of text. In another aspect of the embodiment, the domain is determined based upon meta-data provided with the corpus of text.

20 Claims, 1 Drawing Sheet

(56) References Cited

U.S. PATENT DOCUMENTS

| | | |
|---|---|---|
| 2003/0014448 A1 | 1/2003 | Castellanos et al. |
| 2003/0212655 A1 | 11/2003 | Volcani et al. |
| 2006/0080083 A1 | 4/2006 | Lin et al. |
| 2009/0132496 A1 | 5/2009 | Chen et al. |
| 2009/0199079 A1 | 8/2009 | Pratley |
| 2010/0153889 A1 | 6/2010 | Krause |
| 2011/0184720 A1 | 7/2011 | Zangvil |

FOREIGN PATENT DOCUMENTS

| | | |
|---|---|---|
| CN | 102184256 A | 9/2011 |
| JP | 2011175574 | 9/2011 |

* cited by examiner

DOMAIN SPECIFIC NATURAL LANGUAGE NORMALIZATION

CROSS-REFERENCE TO RELATED APPLICATION

This application is a Continuation of U.S. application Ser. No. 13/414,687, filed Mar. 7, 2012, the entirety of which is incorporated herein by reference.

BACKGROUND OF THE INVENTION

1. Field of the Invention

The present invention relates to natural language processing and more particularly to text simplification.

2. Description of the Related Art

Natural language processing is a branch of artificial intelligence that pertains to the analysis, understanding and generation of the languages that humans use naturally in order to interface with computers in both written and spoken contexts using natural human languages instead of computer languages. Natural language processing is a general umbrella term that encompasses many different species of study that range from natural language understanding and speech recognition to part of speech tagging and text extraction. One species of interest under the umbrella of natural language processing is text simplification.

Text simplification pertains to the reduction of modification of text in a textual corpus so as to simplify the corpus of text in terms of grammatical or linguistic complexity, or to merely reduce the size of the corpus of text. Generally, text simplification requires first the parsing of the corpus of text to identify and index the different words of the text, and the replacement or removal of the particular words in the index according to one or more textual simplification rules. In this way, the corpus of text can be simplified to produce either a smaller corpus of text, or at least a simpler corpus of text.

BRIEF SUMMARY OF THE INVENTION

Embodiments of the present invention address deficiencies of the art in respect to natural language processing and provide a novel and non-obvious method, system and computer program product for the domain specific normalization of a corpus of text. In an embodiment of the invention, a method for domain specific normalization of a corpus of text is provided, including an industrial, organization, demographic or geographic domain. The method includes loading a corpus of text in memory of a computer and determining a domain for the corpus of text. The method also includes retrieving a lexicon of replacement words for the determined domain. Finally, the method includes text simplifying the corpus of text using the retrieved lexicon. In one aspect of the embodiment, the domain is determined through inference based upon words already presence in the corpus of text. In another aspect of the embodiment, the domain is determined based upon meta-data provided with the corpus of text.

In another embodiment of the invention, a natural language data processing system can be configured for domain specific normalization of a corpus of text. The system can include a host computing system that includes at least one computer with memory and at least one processor. The system also can include a natural language processor providing logic configured for text simplification executing in the memory of the computer. Finally, the system can include a domain specific normalization module of the natural language processor. The module in turn can include program code executing in the host computing system enabled to load a corpus of text, to determine a domain for the corpus of text, to retrieve a lexicon of replacement words for the determined domain, and to direct the natural language processor to text simplify the corpus of text using the retrieved lexicon.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for domain specific normalization of a corpus of text. In accordance with an embodiment of the invention, a corpus of text can be received for processing and a domain can be determined for the corpus of text, for example based upon a known context of the corpus of text, or alternative through the inferential determination of the context by parsing text from the corpus of text, or by parsing meta data associated with the corpus of text. In this regard, the domain can be an industrial domain for a particular industry, a geographic domain for a particular geographic region, an organizational domain for a particular organization, or a demographic domain for a particular demographic trait such as age, gender, religion, ethnicity, and the like. Once the domain has been determined, a mapping of word replacements can be retrieved for the determined domain and text simplification of the corpus of text can be performed using the mapping. In this way, the corpus of text can be altered to language suitable for the determined domain.

Figure 1:
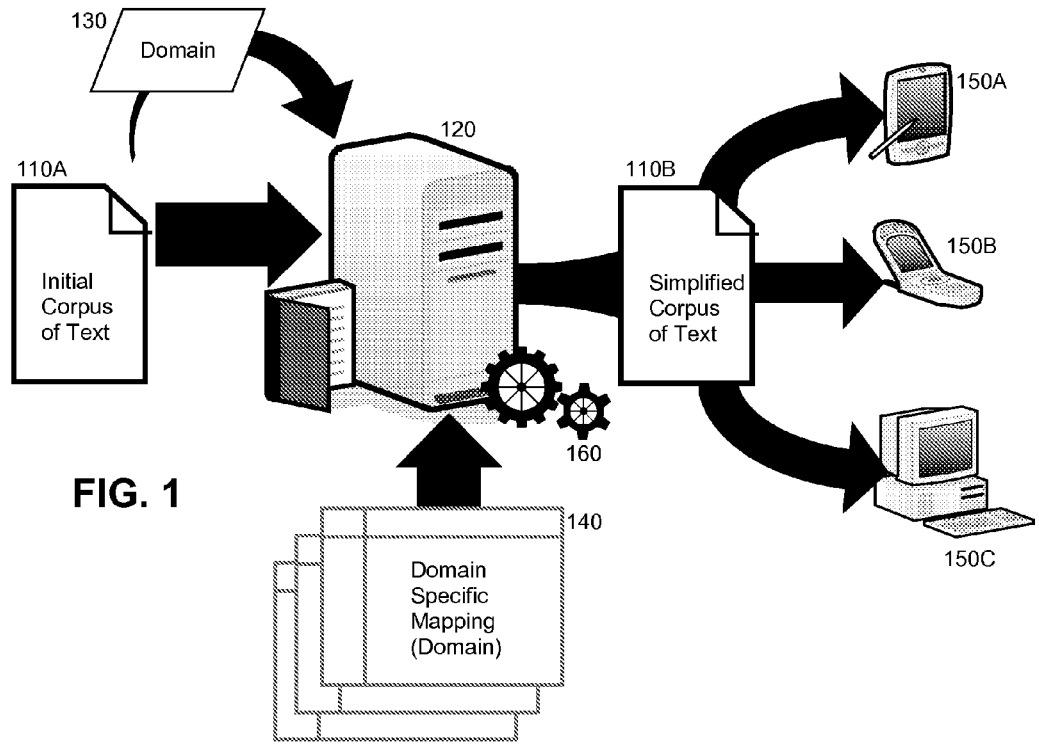
FIG. 1 is a pictorial illustration of a process for domain specific normalization of a corpus of text.

In further illustration, FIG. 1 is a pictorial illustration of a process for domain specific normalization of a corpus of text. As shown in FIG. 1, an initial corpus of text 110A can be provided to natural language processing system 120 and a domain 130 can be determined for the initial corpus of text 110. For instance, the domain 130 can be determined based upon meta-data provided with the initial corpus of text 110, or from the initial corpus of text 110A itself, for example by recognizing the presence of words or phrases in the initial corpus of text 110A previously correlated to a particular domain. Thereafter, a domain specific lexicon of terms or mapping 140 can be selected based upon the determined domain 130 and can be used during text simplification process 160 to transform the initial corpus of text 110A into the simplified corpus of text 110B. Once the simplified corpus of text 110B has been produced, the simplified corpus of text 110B can be delivered to end users 150A, 150B, 150C for example as part of a Web page, voice response transcript, or document, to name only a few examples.

Figure 2:
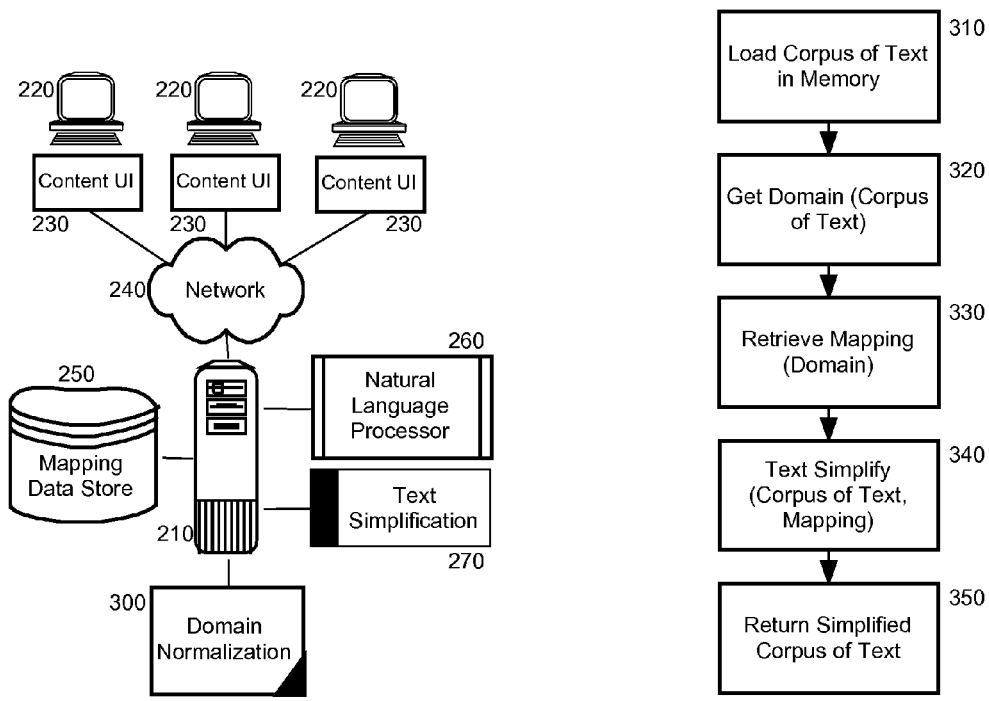
FIG. 2 is a schematic illustration of a natural language data processing system configured for domain specific normalization of a corpus of text; and, FIG. 3 is a flow chart illustrating a process for domain specific normalization of a corpus of text.

The process described in connection with FIG. 1 can be implemented within a natural language data processing system. In yet further illustration, FIG. 2 is a schematic illustration of a natural language data processing system configured for domain specific normalization of a corpus of text. The system of FIG. 2 can include a host computing system 210 that includes one or more computers, each including memory and at least one processor. The host computing system 210 can be communicatively coupled to different clients 220 over computer communications network 240, each supporting the execution of a content user interface 230 such as a Web browser through which Web content can be viewed, or an audio interface such as a telephone interface through which speech interactions with a voice recognition system can be supported.

Of note, a natural language processor 260 can execute in the memory of the host computing system 210. The natural language processor 260 can be configured to perform natural language processing on a corpus of text, including parsing and natural language understanding. Further, text simplification logic 270 can be coupled to the natural language processor 260 and enabled to perform text simplification upon a corpus of text according to a mapping or lexicon of words disposed within a mapping data store 250

In this regard, the mapping data store 250 can include fixed storage including different mappings for different domains, each domain having a corresponding lexicon of words for the domain. Further, a mapping at the minimum is an association between a word or words in an input corpus of text and zero or more replacement words suitable for the specific domain associated with the mapping. In particular, the domains for which mappings are provided in the mapping data store 250 can include by way of example, one or more industrial domains specific to respectively different industries, one or more organizational domains specific to respectively different organizations, one or more demographic domains specific to one or more demographic groupings, such as age, gender, religion, ethnicity and political affiliation, and one or more geographical domains.

Importantly, domain normalization module 300 can be coupled to the natural language processor 260. The domain normalization module 300 can include program code then when executed in memory of the host computing system 210 can be enabled to determine for an initial corpus of text a corresponding domain and to direct the text simplification of the initial corpus of text into a simplified corpus of text using a mapping consistent with the determined domain. In this way, the content of the corpus of text can be transformed from a generic form to a form familiar to an individual of the determined domain by using language in the corpus of text consistent with the language of the determined domain.

Of note, the mapping can be created in respect to a single end user or in respect to multiple end users. For example, different replacement terms can be mapped to a source term according to the subjective input of different end users. Each replacement term can be assigned a complexity value relative to the complexity of the source term. An average of complexity values can be computed for the different replacement terms contributed by the different end users for the source term and the term most aligned with the average of the complexity values can be selected as the mapped replacement term for the source term. In this way, the replacement terms mapped to corresponding source terms in the mapping can dynamically change according to the dynamic contributions of the different end users to the mapping.

Figure 3:
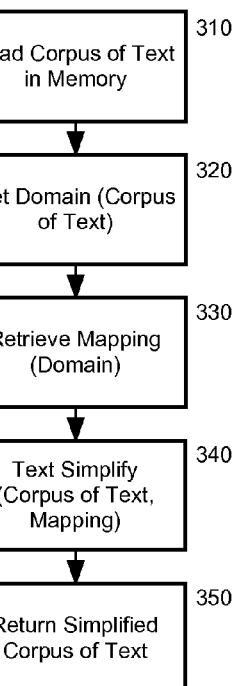

In even yet further illustration of the operation of the domain normalization module 300, FIG. 3 is a flow chart illustrating a process for domain specific normalization of a corpus of text. Beginning in block 310, a corpus can be loaded into memory. In block 320, a domain can be determined for the corpus, for example by inspecting meta-data provided with the corpus of text, or by inferring the domain through a natural language understanding analysis of the corpus of text. Thereafter, in block 330 a mapping can be retrieved corresponding to the determined domain. Finally, in block 340 the corpus of text can be text simplified using the mapping and the simplified corpus of text can be returned for presentation visually or audibly, or both, in a requisite content user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for domain specific normalization of a corpus of text, the method comprising:
    loading a corpus of text in memory of a computer;
    determining by a processor of the computer a domain for the corpus of text by recognizing a presence of words or phrases in the loaded corpus of text that had been previously correlated to the domain;
    retrieving from the memory of the computer by the processor of the computer a lexicon of replacement words for the determined domain, the lexicon comprising a set of source terms, at least one of the source terms being mapped to one of multiple different replacement terms having a complexity value aligned with an average complexity value for the multiple different replacement terms; and,
    text simplifying by the processor of the computer the corpus of text using the retrieved lexicon by replacing existing words in the corpus of text with the replacement words.

2. The method of claim 1, wherein the domain is an industrial domain.

3. The method of claim 1, wherein the domain is an organizational domain.

4. The method of claim 1, wherein the domain is a demographic domain.

5. The method of claim 1, wherein the domain is a geographic domain.

6. The method of claim 1, wherein the domain is determined through inference based upon words already present in the corpus of text.

7. The method of claim 1, wherein the domain is determined based upon meta-data provided with the corpus of text.

8. A natural language data processing system configured for domain specific normalization of a corpus of text, the system comprising:
    a host computing system comprising at least one computer with memory and at least one processor;

a natural language processor providing logic configured for text simplification executing in the memory of the computer; and, a domain specific normalization module of the natural language processor comprising program code executing in the host computing system enabled to load a corpus of text, to determine a domain for the corpus of text by recognizing a presence of words or phrases in the loaded corpus of text that had been previously correlated to the domain, to retrieve a lexicon of replacement words for the determined domain, the lexicon comprising a set of source terms, at least one of the source terms being mapped to one of multiple different replacement terms having a complexity value aligned with an average complexity value for the multiple different replacement terms, and to direct the natural language processor to text simplify the corpus of text using the retrieved lexicon by replacing existing words in the corpus of text with the replacement words.

9. The system of claim 8, wherein the domain is an industrial domain.

10. The system of claim 8, wherein the domain is an organizational domain.

11. The system of claim 8, wherein the domain is a demographic domain.

12. The system of claim 8, wherein the domain is a geographic domain.

13. The system of claim 8, wherein the program code of the module determines the domain through inference based upon words already present in the corpus of text.

14. A computer program product for domain specific normalization of a corpus of text, the computer program product comprising:

a non-transitory computer readable storage medium comprising a device having computer readable program code embodied therewith, the computer readable program code comprising:

computer readable program code for loading a corpus of text in memory of a computer;

computer readable program code for determining a domain for the corpus of text by recognizing a presence of words or phrases in the loaded corpus of text that had been previously correlated to the domain;

computer readable program code for retrieving a lexicon of replacement words for the determined domain, the lexicon comprising a set of source terms, at least one of the source terms being mapped to one of multiple different replacement terms having a complexity value aligned with an average complexity value for the multiple different replacement terms; and, computer readable program code for text simplifying the corpus of text using the retrieved lexicon by replacing existing words in the corpus of text with the replacement words.

15. The computer program product of claim 14, wherein the domain is an industrial domain.

16. The computer program product of claim 14, wherein the domain is an organizational domain.

17. The computer program product of claim 14, wherein the domain is a demographic domain.

18. The computer program product of claim 14, wherein the domain is a geographic domain.

19. The computer program product of claim 14, wherein the domain is determined through inference based upon words already present in the corpus of text.

20. The computer program product of claim 14, wherein the domain is determined based upon meta-data provided with the corpus of text.

* * * * *